United States Patent [19]

Bell et al.

[11] Patent Number: 4,465,720

[45] Date of Patent: * Aug. 14, 1984

[54] AUTOMOTIVE FLOOR MAT HAVING RIGIDIFYING SHEET-FORM ELEMENT

[75] Inventors: Ted A. Bell; Timothy S. Cooksey; Daniel F. Lehner, all of Coshocton, Ohio

[73] Assignee: Pretty Products, Inc., Coshocton, Ohio

[*] Notice: The portion of the term of this patent subsequent to Aug. 16, 2000 has been disclaimed.

[21] Appl. No.: 365,578

[22] Filed: Apr. 5, 1982

Related U.S. Application Data

[63] Continuation-in-part of Ser. No. 318,841, Nov. 6, 1981, Pat. No. 4,399,176, which is a continuation-in-part of Ser. No. 135,253, Mar. 31, 1980, abandoned.

[51] Int. Cl.$^3$ .................... B62D 25/20; B62D 9/00
[52] U.S. Cl. ............................ 428/85; 296/1 F; 428/95; 428/102; 428/167
[58] Field of Search ............... 428/167, 85, 95, 102, 428/105, 156; 296/1 F; 180/90.6; 15/238; 4/581, 661; D12/203

[56] References Cited

U.S. PATENT DOCUMENTS

| | | | |
|---|---|---|---|
| 3,450,429 | 7/1969 | Stata | 296/1 F |
| 4,242,395 | 12/1980 | Zuckerman | 428/95 |
| 4,361,610 | 11/1982 | Roth | 428/95 |

FOREIGN PATENT DOCUMENTS

2728180  1/1979  Fed. Rep. of Germany ...... 296/1 F

Primary Examiner—Paul J. Thibodeau
Attorney, Agent, or Firm—Robert E. Stebens

[57] ABSTRACT

A floor mat for an automotive vehicle is provided having a relatively thin, flexible sheet-form main body and a rigidifying sheet-form element formed with or secured thereto in fixed relationship. The rigidifying element is fabricated from or formed by sheets of material that are effectively rigid in thin sheet-form and thereby render the otherwise flexible main body essentially inflexible. The materials selected to form the rigidifying elements preferably have a resilient characteristic, such as spring steel wire rod or inherent resilient rubber or plastic materials to enhance the mat's ability to maintain itself in a desired smooth, flat configuration on a vehicle's floor. The rigidifying element is of a configuration to rigidify the main body throughout most of its vehicle floor contacting area to resist displacement in all directions through the essential, rigidified portion of the mat encountering of any obstructions associated with the vehicle floor and the resilient characteristic of the rigidifying element accommodating excessive displacing forces and tending to return the main body of the mat to its original configuration. The rigidifying elements may be rod-like elements or thin, flat sheets of material either integrally embedded in or formed with the sheet-form main body or they may be mechanically secured thereto.

21 Claims, 11 Drawing Figures

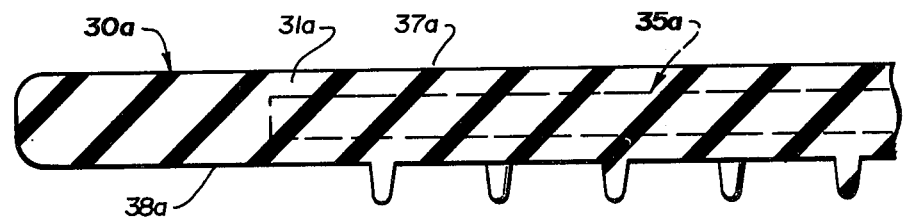
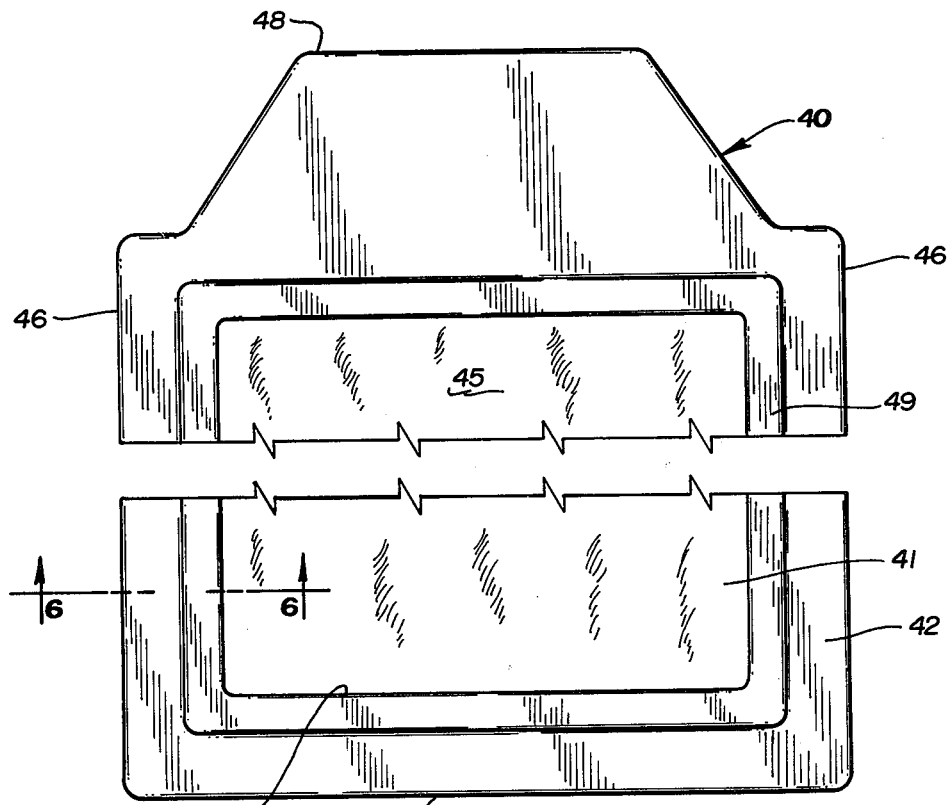
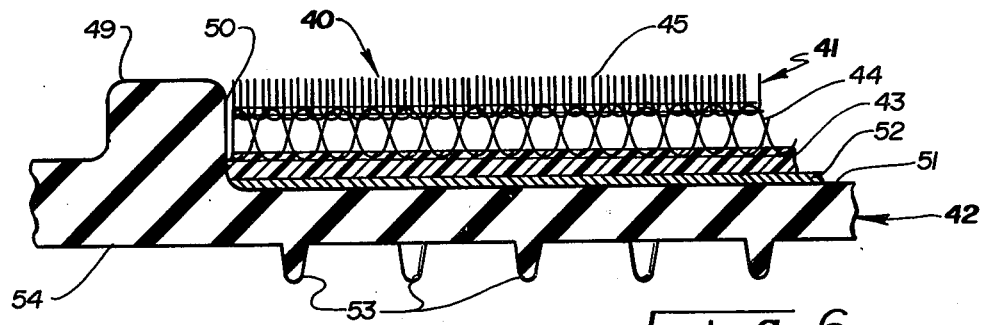

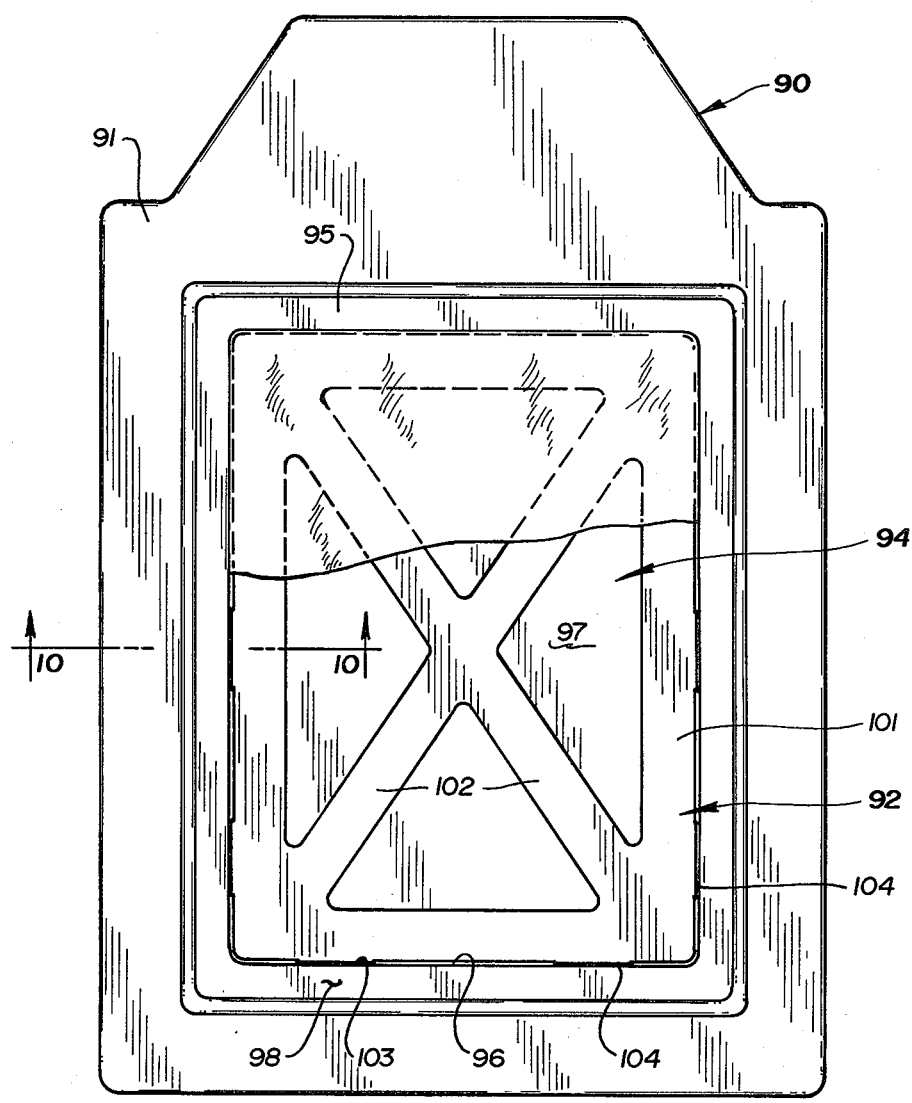

AUTOMOTIVE FLOOR MAT HAVING RIGIDIFYING SHEET-FORM ELEMENT

This application is a continuation-in-part of Ser. No. 318,841 filed Nov. 6, 1981, now U.S. Pat. No. 4,399,176 granted Aug. 16, 1983, and which application is a continuation-in-part of Ser. No. 135,253 filed Mar. 31, 1980, which latter application is now abandoned.

FIELD OF THE INVENTION

This invention, in general, relates to floor mats designed for use in automotive vehicles. It relates more specifically to a floor mat of this type embodying a construction whereby a thin sheet of rubber or plastic material that is relatively flexible is rendered effectively rigid by combination with a thin, rigidifying sheet-form element in a unitary structure.

BACKGROUND OF THE INVENTION

Floor mats of many diverse designs have been developed for utilization in automotive vehicles, particularly passenger cars, and are currently extensively utilized for protection of the carpeted floor areas of automotive vehicles and specifically those areas associated with the front seat. These floor mats have been produced in various styles, designs and configurations with major style categories being either a single mat extending across the entire width of the vehicle and termed a full mat or a pair of mats designated as twin mats wherein separate mats are provided at each of the respective sides of the vehicle. The floor mat construction of this invention is specifically directed to the twin style mat, although it does have application to other styles of mat configurations.

A twin style mat for the front seat area of a passenger car has a basic dimensional configuration such that it is of a length to extend forwardly over at least the lower portion of what is often designated as the fire wall or engine compartment wall which is usually upwardly inclined in a forward direction. Also, these mats are often of a dimensional width such that the opposite longitudinal edge portions at each side of the mat project a sufficient distance laterally to extend up over the central tunnel that exists in many vehicles as well as to project upwardly adjacent the side sill adjacent a door area. Obviously, in the case of vehicles that do not have a central tunnel, the edge portion of the mat disposed adjacent the center area of the vehicle will merely project over the central, substantially flat floor surface. In the case of mats designed for placement in the rear passenger seat area, such mats are of a design configuration that normally does not project forwardly in the manner of the front mats, but they often include longitudinal side portions that do extend over the tunnel or upwardly adjacent the side sill of the vehicle. Depending upon the particular vehicle and relative size of a floor mat selected for that vehicle, it may be that the floor area is sufficiently large such that the mat will only occupy a flat surface area.

It is particularly important to design the floor mats so that they will tend to stay in a desired and selected position in the vehicle regardless of whether the floor surface is totally flat or has upwardly projecting surface portions. To achieve that objective, floor mats as heretofore designed have usually incorporated a multiplicity of relatively short, conically-shaped projections, or nibs, that were integrally formed with the mat and projected downwardly from a lower or bottom surface of the mat. Since most mats are of a design construction that embodies molding of the mat from a rubber or plastic composition, it has been relatively easy to form those nibs. The function of these nibs, and these nibs are relatively short and may only be of the order of one-sixteenth inch in length, is to project into the carpet floor covering of the vehicle and thereby form a mechanical interengagement that is intended to retain the floor mat in a selected position. However, the nibs that have heretofore been provided for that purpose have been found to be substantially less effective than desired because of the relatively short length of those nibs. The short length prevents the nibs from penetrating to any significant depth in the carpet and thus the mat must rely primarily on surface friction for the maintenance of the mat in the desired position. It is not feasible to form the nibs of any substantial length for increased penetration and better holding capability since those nibs would then either be relatively thin or relatively thick and most likely not readily penetrate the relatively close fiber pile construction of the conventional carpet surfacing. In fact, long, thin nibs would not only fail to readily penetrate a conventional fiber pile because of greater flexibility, but that flexibility would significantly reduce their effectivity in holding the mat against laterally directed forces.

As a consequence of the failure of the nibs to effect an adequate mechanical interengagement with the underlying carpet, and the lack of any other significant surface frictional forces, the floor mats heretofore provided have a strong tendency to shift and move laterally over the carpet surfacing in the vehicle. Such lateral shifting movement results from sliding movement of a person's feet when positioned on a mat or the development of laterally directed forces applied to a carpet through a person's feet while entering or exiting the vehicle. This is highly undesirable in that the mat not only loses its neat looking appearance, but additionally, it frequently will shift into position where it does not protect the floor carpet and, in the case of the driver's station, can easily move into interfering relationship with operating and control components of the vehicle such as the accelerator, light switches, and similar type elements.

The foregoing discussion is directed to floor mats intended for use with vehicles having carpeted floors and it will be readily apparent that mats provided with nibs on their bottom surfaces will not be particularly effective with smooth or hard faced surfaces. While no mat structures or designs are known to exist to improve resistance to lateral displacement over such a floor surface, the problem is not of great significance because there is not the great need to attempt protecting such floor surfaces as in the case of carpeted floors.

SUMMARY OF THE INVENTION

A floor mat as provided in accordance with this invention for utilization in automotive vehicles is constructed to have a degree of rigidity in a least portions of an otherwise flexible sheet and thus tend to retain a planar configuration that will effectively resist sliding movement over non-planar floor surfaces. In general, the embodiments of the invention disclosed herein incorporate a thin, sheet-form, rigidifying element integrally formed in, embedded in securely fixed relationship, or otherwise mechanically secured to a thin, flexible-sheet mat structure. The functional objective of incorporation of the rigidifying element is to provide a degree of inflexibility to the floor mat which is otherwise formed as a thin sheet from a flexible material such as rubber or plastic. The configuration of the rigidifying elements is that, in a preferred design, they will comprise a surface area that is slightly less than a floor-pan area of the vehicle floor with which the mat will be used. The rigidifying element will thus normally have a generally rectangular shape in plan view having longitudinal side edges that extend in substantially close conformity with the respective longitudinally extending portions of either the tunnel or the sidewall of the vehicle. As a consequence of the relative inflexibility of the resultant mat structure of this invention, the mat then will tend to not move or shift laterally over the non-planar surfaces of the vehicle's floor. The rigidifying element may be formed as a thin sheet from either a metallic or plastic wire rod or from a plastic material or a hard rubber having the necessary structural rigidity characteristics to effectively rigidify at least selected portions of the thin sheet of rubber or plastic forming the main body of the mat. While the term "rigid" is used in this specification to describe the rigidifying element, "rigid" is not necessarily used in its strict literal sense, but is used to distinguish the substantial flexibility of the main body. In actuality, the rigidifying elements will also have a degree of flexibility because of their thinness and, in fact, it is preferred that the rigidifying elements be formed from a material that is resilient or elastic so that they can accommodate forces that would otherwise result in deformation of the element.

These and other objectives of this invention will be readily apparent from the following detailed description of illustrative embodiments thereof and the accompanying drawings.

DESCRIPTION OF THE DRAWING FIGURES

FIG. 4A is a fragmentary vertical sectional view similar to FIG. 4, but showing a modification of that structure.

FIG. 5 is a top plan view of another modified floor mat having a sheet-form rigidifying element and embodying this invention.

FIG. 6 is a fragmentary sectional view on a substantially enlarged scale taken along line 6—6 of FIG. 5.

FIG. 9 is a top plan view of another modified floor mat having a sheet-form rigidifying element and embodying this invention.

FIG. 10 is a fragmentary vertical sectional view on a substantially enlarged scale taken along line 10—10 of FIG. 9.

DESCRIPTION OF THE ILLUSTRATIVE EMBODIMENTS

Figure 1:
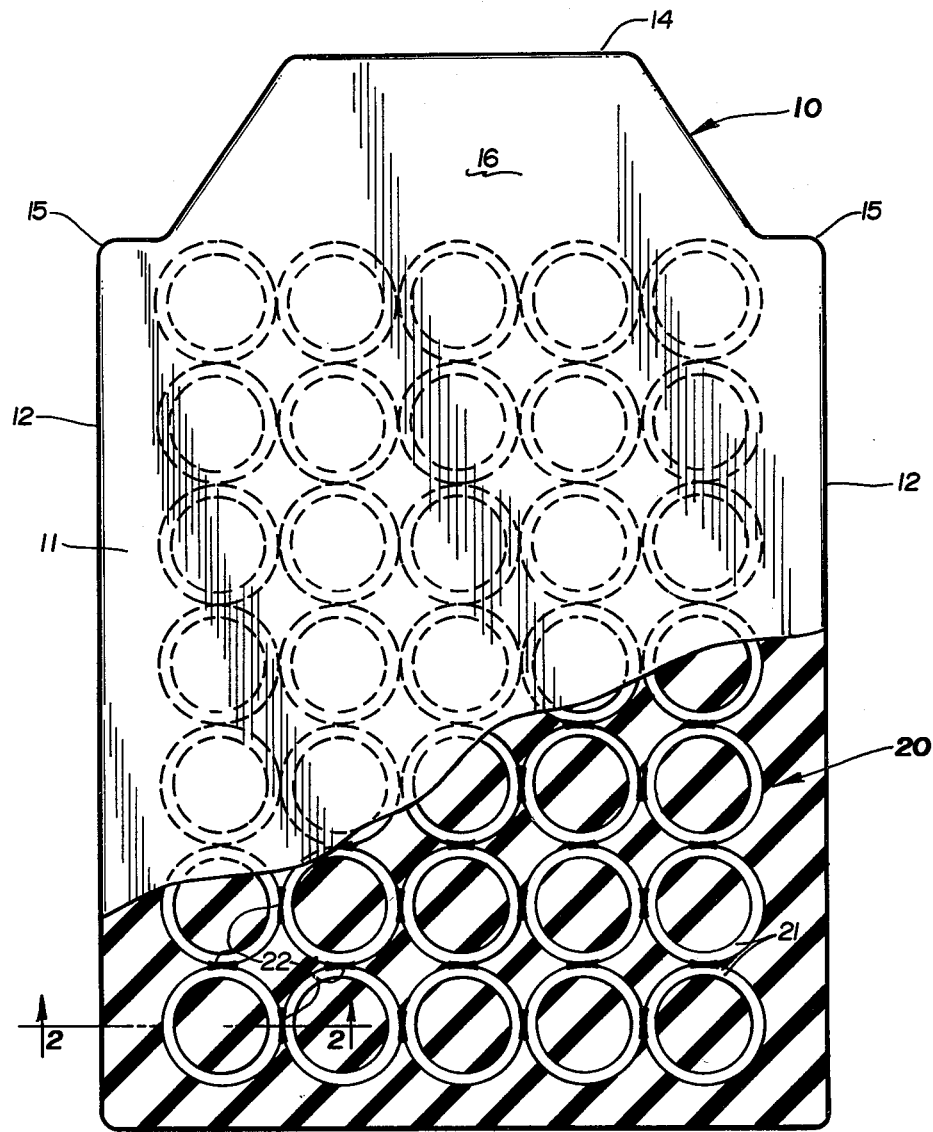
FIG. 1 is a top plan view of an automotive floor mat having a sheet-form rigidifying element and embodying this invention with a portion of the upper surface body removed for clarity of illustration.
Figure 2:
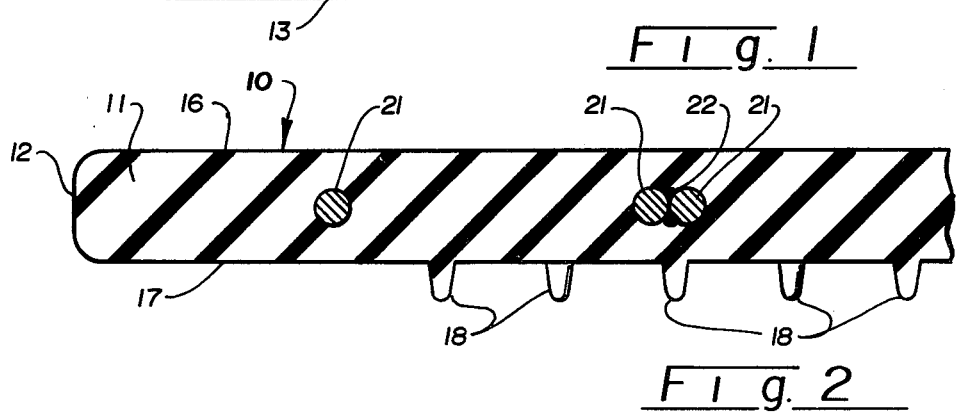
FIG. 2 is a fragmentary vertical sectional view on a substantially enlarged scale taken along line 2—2 of FIG. 1.

Referring specifically to FIGS. 1 and 2, an automotive floor mat is illustrated therein which is shown as comprising a typical configuration for a front mat. This mat is designated generally by the numeral 10 and includes a main body 11 formed from a sheet of flexible material, such as either a rubber or plastic composition. This main body is of a generally rectangularly shaped configuration which, in this illustrative embodiment, has a larger primary portion designed to overlie the flat, horizontal floor-pan area of the vehicle and a relatively smaller portion formed at the front for extending a distance upwardly over the upwardly and forwardly inclined engine compartment wall found in a large number of vehicle body styles. Thus, the illustrative mat configuration is seen to include a peripheral edge having opposed longitudinal side edges 12, a transverse rear edge 13 and a composite front edge 14. This composite front edge 14 defines the front portion of the mat that is intended to overlie the upwardly inclined engine compartment wall and is seen to define an area of trapezoidal configuration. Opposite ends of the composite front edge 14 join with the longitudinal side edges 12 at a point with respect to the overall total length of the mat such that those juncture points 15 may coincide closely with the juncture between the flat, horizontal portion of the vehicle floor and the engine compartment wall.

As previously indicated, the main body 11 of the floor mat is advantageously fabricated from a suitable rubber or plastic composition. Such materials may be readily formed by well-known molding techniques into a relatively thin, flexible sheet having the desired design configuration. Although not shown in the illustrative embodiments, such mats frequently incorporate ornamental design features either formed on an upper surface 16 or in an upper surface layer. These mats are of a relatively thin construction with the thickness between the upper surface 16 and a lower surface 17 being of the order of ⅛ to ¼ inch. Also, in a typical mat construction of this type, the main body 11 is advantageously provided with a multiplicity of relatively short and conically-shaped projections or nibs 18 that are formed on the lower surface 17. These nibs 18 are preferably integrally formed with the main body of the mat during the molding process.

In accordance with this invention, the mat is provided with a rigidifying sheet-form element 20 which, in this specific embodiment, is of a rectangular configuration and dimensioned to be of a surface area that is slightly less than the primary surface area of the mat's main body 11. The rigidifying element 20 is formed from a metallic rod such as a steel wire having a diameter of the order of 1/16 inch, which dimension is substantially less than the thickness of the main body 11, formed in a plurality of circular rings 21 of 2-3" diameter that are secured together to form a sheet. Thus, as can be seen in FIG. 2, the rigidifying element may be totally embedded within the main body where it will be firmly fixed in the surrounding mass of rubber or plastic material. This may be accomplished concurrently with the molding operation in forming the main body. The wire rod selected for the rigidifying element 20 is first formed in the illustrated configuration by fabricating the several rings 21, assembling the rings in the desired configuration and then rigidly interconnecting the adjacent rings to each other at their respective points of juncture 22 as by welding so as to achieve a structural integral sheet. Advantageously, the wire rod portions forming the respective rings may have their junctures located at the juncture with an adjacent ring for concurrent welding although each ring may be prewelded to eliminate an orientation step that would be otherwise required. Suitable welding techniques do not result in formation of any bulky weld that would significantly increase the total thickness. When thus formed, the sheet-form element 20 may then be placed with the rubber or plastic composition materials in a press mold and supported therein in the cavity so as to be properly positioned with respect to the upper and lower surfaces 16 and 17 of a fabricated mat and centrally located in the main body of the mat. This placement of the rib results in a uniform thickness of the main body portion of the mat both above and below the element, thereby decreasing the likelihood of the rib being visually observed at either surface of the mat and achieving optimum structural integrity of the composite structure.

The rigidifying element 20 in the FIG. 1 embodiment of this invention is formed from steel rather than plastic to assure that it will withstand the elevated temperatures encountered during the molding operation for curing of the rubber material. Obviously, if a suitable plastic material were available that could also withstand the rubber curing temperature and maintain its shape and physical properties, such a material could be used in fabrication of the rigidifying element. A rigidifying element fabricated from a plastic material could be conveniently molded as a unitary structure. It will also be noted that the term "rigidifying" is used in identifying the element 20, but it will be readily apparent that this element is formed from a wire of such a small diameter that it is not rigid in the true sense of the word. The wire rod is certainly not so structurally strong that it cannot be bent, but the wire rod is rigid in a comparative sense as to the rubber sheet forming the main body 11 of the mat. The wire rod forming the rigidifying element 20 is fabricated from a steel that enables the sheet-form element in this cross-sectional size to flex or bend under the forces expected to be applied during use. For example, a person entering or exiting a vehicle will exert a substantial force through pressing one foot against the floor mat and, if applied in the area of the sheetform element, will most likely be sufficient to deform the element or cause it to flex downwardly because of the yielding characteristic of the underlying carpet. Since it is undesirable that the rigidifying element 20 retain a deformed configuration when once flexed, and it is not a practical feasibility to form the wire rod with such a large cross-section as to be inflexible and capable of fully resisting reasonably expected forces, it is preferred that the element be fabricated from a steel wire rod having a characteristic resilient property. A spring steel found suitable for the wire rod is designated as ASTM 228. There are other spring steels commercially available that could also be used and other spring steels may be selected with due consideration to the cross-section of the rod. If a plastic material were found suitable to meet the elevated molding temperature requirement, consideration would also be given to resilient properties of the plastic to assure that a plastic element would also return to its original configuration.

The particular configuration of the sheet-form rigidifying element 20, as illustrated in FIG. 1, is of a rectangular shape having longitudinal side edges, transversely extending rear and front edges as defined by the outer portions of the rings 21 at the periphery of the element. Orientation of the rectangular rigidifying element 20 in the illustrative embodiment of FIGS. 1 and 2 is such that the opposed longitudinal side edges are each disposed a predetermined distance inwardly of the respective longitudinal side edges 12 of the main body 11 with the rear edge also disposed a predetermined distance inwardly with respect to the transverse rear edge 13 of the mat. The front edge of the rigidifying element is positioned so that it does not lie within the front portion of the main mat body and preferably is disposed a predetermined distance rearwardly with respect to an imaginary line interconnecting the opposed juncture points 15 and which may coincide with the juncture of the vehicle's horizontal floor surface and the engine compartment wall. Preferably, the relative location of the longitudinal side edges of the rigidifying element are such that, with a main mat body having a width such that longitudinal marginal edge portions would tend to overlie and extend upwardly with respect to either or both the center tunnel or the side wall of the car, these side elements would substantially coincide with the juncture line of the tunnel and side wall, respectively, with respect to the flat, horizontal floor of the vehicle. The result of this construction is that the mat body which is co-extensive with rigidifying element 20 becomes an effectively rigid sheet. While not essential to effective functioning, it is desirable that the rigidifying element 20 be of an area size that is substantially equivalent to the horizontal surface area or floor-pan area of a vehicle. Making the rigidifying element with an area dimension such that the mat will function with a selected minimum floor-pan area will permit use of the mat in vehicles with somewhat larger floor-pan areas without significant loss of function, thereby enhancing versatility.

Functioning of the rigidifying sheet-form element 20 in combination with the main mat body 11 to restrict and essentially prevent lateral displacement of the mat over the surface of the vehicle floor can be readily understood through consideration of the mechanical and geometrical relationships of the mat and the vehicle floor. In a floor mat of the prior construction that merely comprises a thin, sheet-form body formed from a material such as rubber and which does not incorporate a rigidifying element 20, the body will be relatively flexible and can readily move so as to travel over and accommodate itself to irregular surface areas such as the juncture between the flat surface portions of the vehicle floor and the upwardly projecting tunnel, side wall or engine compartment wall. This movement will occur as a consequence of a person moving their feet across the floor with a sliding motion or when a person enters or exits the vehicle. When merely sliding a foot across the floor, sufficient frictional forces are developed between a person's shoe and the surface of a rubber or plastic mat to overcome the restraining forces that may be developed by any nibs formed on the bottom surface through their interengagement with an underlying carpet surface. This action will result in a lateral shifting of the mat, a movement which may be in small increments. Movement of a flexible sheet mat of the prior art type not provided with a rigid rib as in accordance with this invention will not be prevented by upwardly extending surfaces such as the center tunnel, the engine compartment wall or door sill wall. Such flexible sheet mats will merely bend and flex to conform to and follow around or over any irregular, non-planar surfaces that are encountered.

However, by forming the mat with a rigidifying sheet-form element 20 in accordance with this invention, as is illustrated and described, it will be substantially impossible for the mat to shift laterally over the floor surface because of the side and end edges of element 20 engaging respective junctures of the vehicle's horizontal floor with the other upwardly extending surface components. For any further lateral shifting of a mat to occur, there must be a sufficient force applied to result in vertical lifting of a substantial portion of the main body portion of the mat. This results from the fact that the transverse elements in the case of transverse shifting, must tend to raise the intermediate section of the mat if an upwardly extending surface such as the center tunnel or the vehicle side wall is encountered. The weight of the mat will aid in tending to resist such vertical displacement that could be occasioned by laterally directed, shifting forces that are normally expected to be applied through the course of movement of a person's feet over the surface of the mat. This functional characteristic is also applicable to a longitudinal shifting of the mat in a forward direction since the front edge of the rigidifying element in attempting to move upwardly over the inclined surface of the engine compartment wall will also result in an upward inclination of at least the co-extensive main body and rigidifying element and in effect, require lifting of a substantial portion of the floor mat. Again, the weight of the floor mat itself will tend to resist such lateral shifting. Furthermore, the lateral shifting is only caused in normal instances by the sliding of a person's foot over the mat and, since the weight of the person's foot and associated leg are exerting a downward directed force on the mat, this downwardly directed force will be transmitted through the rigidifying element to that edge encountering an upwardly extending surface and thereby further increase the resistance of the mat to any lateral shifting.

Also, the resilient characteristic of the rigidifying element 20 significantly aids in tending to resist lateral shifting of the mat over upwardly extending surfaces. In a situation where a longitudinal side or front edge of the rigidifying element is at a juncture of the vehicle's horizontal floor with an upwardly extending surface, a further force of sufficient magnitude tending to cause sliding or lateral shifting of a mat may cause upward bowing or flexing of the rigidifying element in a direction transverse to that juncture, thereby tending to reduce the forces on the element, or portion thereof, at the juncture that might otherwise cause that element to be displaced upwardly. Upon subsequent removal of such lateral displacing force, the resilient element will return to its original configuration and the mat will again lie flat on the horizontal vehicle floor. In a mat of the prior art construction that is without a rigidifying element, such mat would most likely buckle and fold upon application of a force sufficient to cause sliding, thereby not only forming unsightly ridges, but placing the mat in a configuration that will actually enhance its ability to move. Subsequent application of sliding forces will find less resistance and may more readily move the mat so as to cause a fold at another point, an action that results in an incremental lateral shifting of the mat. Thus, the resilient characteristic of the rigidifying elements in mats embodying this invention represents an improvement over even providing of a mat that is truly rigid and inflexible, although it will be recognized that a completely rigid and inflexible mat is not feasible from a practical standpoint as previously explained.

Figure 3:
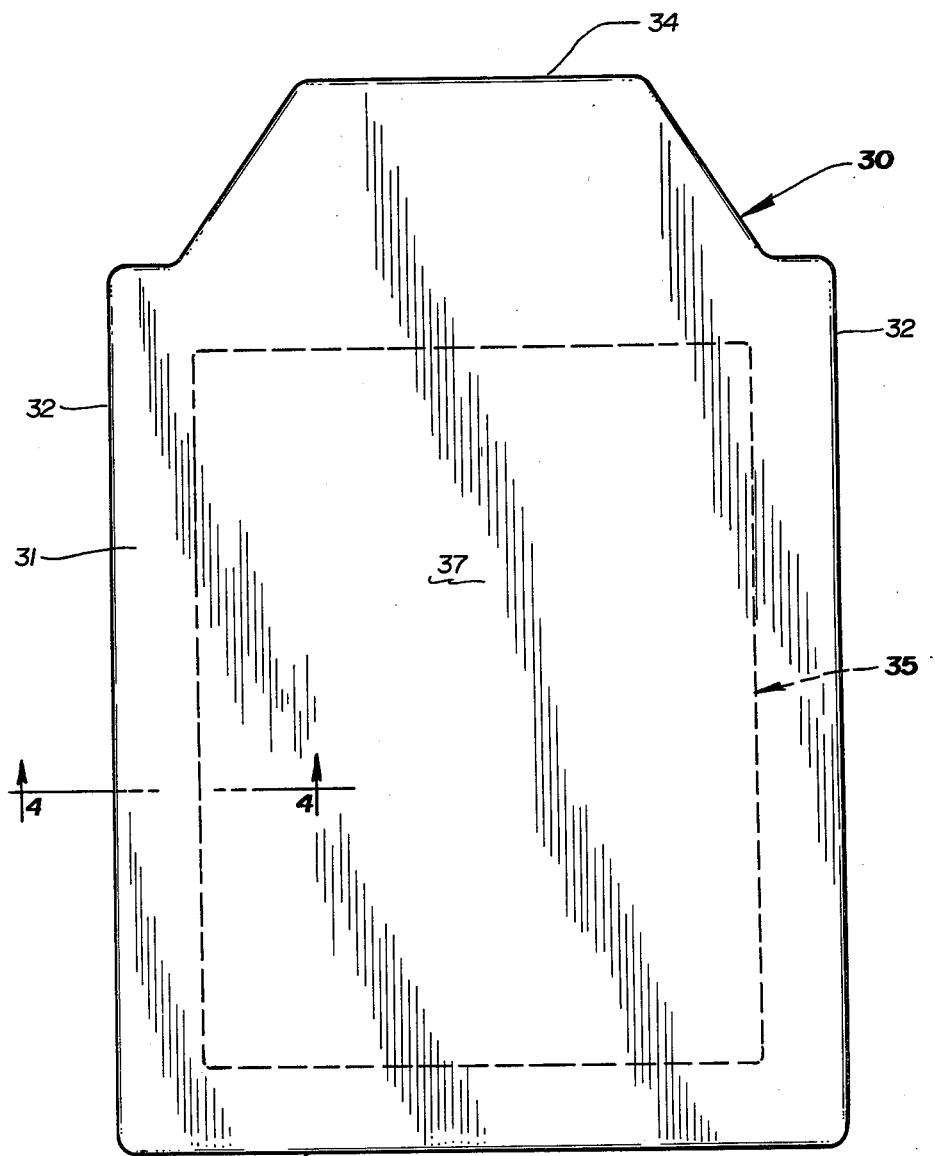
FIG. 3 is a top plan view of a modified floor mat having a sheet-form rigidifying element and embodying this invention.
Figure 4:
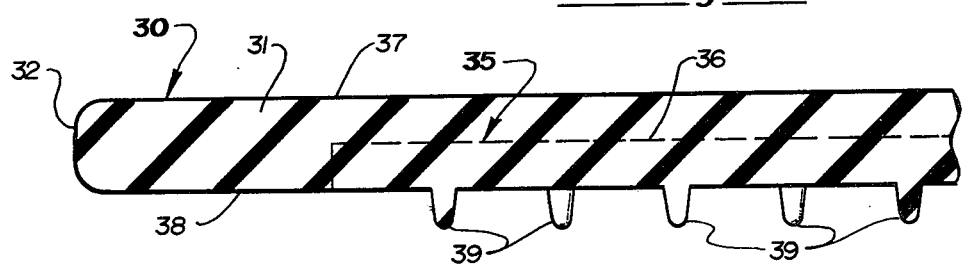
FIG. 4 is a fragmentary vertical sectional view on a substantially enlarged scale taken along line 4—4 of FIG. 3.

A vehicle floor mat 30 of modified construction embodying this invention is illustrated in FIGS. 3 and 4. Again, the floor mat 30 may be of a rectangular construction such as that of FIG. 1. The mat itself comprises a sheet-form main body 31 of relatively thin section and fabricated from a suitable rubber or plastic material and is thus relatively flexible. The main body 31 of the mat thus similarly includes longitudinal side edges 32, a rear transverse edge 33 and a front edge 34. A rigidifying sheet-form element 35 is also provided in the complete structure of the floor mat, but, in this embodiment, the rigidifying element is formed from the same material as the main body, although the particular material forming the element has different characteristics and physical properties. Thus, for a main body 31 of the mat being formed from a flexible rubber material, the rigidifying element 35 would be formed from a rubber material which has a characteristic of being relatively hard and having a substantial degree of structural rigidity along with a resilient characteristic, but compatible to permit molding into an integral unitary structure. This rigidifying element, as illustrated in the drawings, is formed as a flat sheet and, as can be seen in plan view in FIG. 3, is also formed as a rectangle that is oriented in the main body 31 of the mat substantially as described with respect to the FIG. 1 embodiment. The rigidifying element 35 is formed with a peripheral edge 36 which is preferably spaced a distance inwardly from respective longitudinal side edges 32 and rear edge 33, leaving a peripheral marginal edge portion of the main mat body 31 relatively flexible. Also, the rigidifying element does not extend into the front end portion, thereby leaving that portion flexible as in the case of the FIG. 1 embodiment. Its thickness is of the order of one-half of the mat or the main body 31 and is disposed at the bottom of the composite structure. Thus, for a mat having a thickness of ⅛ inch, the rigidifying element 35 would have a thickness of the order of 1/16 inch with its upper surface extending in parallel relationship and at a midpoint to the respective upper and lower surfaces 37, 38 of the main mat body 31. The mat 30 may also be provided with conical projections or nibs 39 on its lower surface to enhance frictional engagement with a carpeted vehicle floor with these nibs preferably formed with the rigidifying element, and therefore, also being relatively rigid.

Fabrication of a mat embodying the construction shown in FIGS. 3 and 4 may be accomplished by a single molding operation wherein a sheet-form layer of a suitable relatively hard rubber material that is to comprise the rigidifying element is appropriately positioned in a mat molding press along with a sheet of the rubber material that is to form the main body of the mat. A rubber material known in the trade as Friction stock may be utilized for the rigidifying element, this material exhibiting the desired structural rigidity and resilience characteristics in the thin sheet-form. The two rubber materials are then simultaneously cured under pressure during the molding operation. As a result of this molding operation, the rigidifying element 35 will be secured and fixed in relationship to the relatively flexible main body 31 of the mat and this is indicated by the broken line showing the point of demarcation between the two rubber materials. The juncture of the two materials is shown as sharp and definite whereas, in actuality, there will be an irregular joining surface resulting from irregular flow characteristics of rubber when it is heated to a flowable state during the curing procedure. In general, the relatively harder rubber will tend to remain in its original stock configuration of a rectangular sheet having a predetermined thickness with the relatively more pliable rubber spreading outwardly in surrounding relationship and resulting in an integrally bonded or molded structure. A rigidifying element 35 of this construction performs in the same manner to achieve the objectives as previously described with respect to the FIG. 1 configurations and constructions for a vehicle floor mat embodying this invention. It will be understood that suitable plastic materials may be substituted for the rubber materials of this illustrative embodiment and produce a vehicle mat having the desired functional features and characteristics.

As an alternative fabricating technique, a mat embodying the construction shown in FIGS. 3 and 4 may be formed in a two step operation. In a two step operation, the Friction stock is first molded and cured into a sheet having the desired surface size and shape and of the desired thickness. In the second step, the molded Friction stock sheet is then placed in mold along with a quantity of the flexible rubber material and the combination is then subjected to pressure and elevated temperature to effect molding and curing of the flexible rubber material as well as joining with the premolded Friction stock in a unitary structure. With this two step procedure, the Friction stock will substantially retain its preformed configuration and there will be a more uniform layer structure such as that depicted in FIG. 4.

A mat embodying a further modification of the structure shown in FIGS. 3 and 4 is illustrated in FIG. 4A which is an enlarged scale, fragmentary sectional view similar to FIG. 4. In this modification, the mat 30a is fabricated with a Friction stock rigidifying element 35a located completely within the flexible rubber main body 31a. This mat can be fabricated by a two step procedure such as that described in the preceding paragraph. A molded and cured sheet of Friction stock is placed in a mold press in between two thin sheets of flexible rubber stock and, as a result of the heat and pressure applied during the molding operation, the flexible rubber will flow around and fully encase the Friction stock and join with the Friction stock thereby producing a unitary structure. As can be seen in FIG. 4A, the rigidifying element 35a indicated by broken lines will be positioned at substantially the center of the main body 31a and intermediate the upper and lower surfaces 37a and 38a thereof.

A third embodiment of this invention is shown in FIGS. 5 and 6. This floor mat 40 comprises a composite structure including two thin, sheet-form main body elements 41 and 42 and a rigidifying sheet-form element 43. One main body element 41 is a sheet of textile carpet material having a woven-fiber or filament base sheet 44 and an upper surface pile layer 45. Sprayed onto the bottom surface of the base sheet 44 is a layer of thermoplastic material which forms the rigidifying element 43. This thermoplastic material flows into the bottom surface layer of the woven fiber base 44 and results in formation of a unitary structure. A thermoplastic material is selected which, when set, exhibits a relatively rigid structural characteristic, even in a relatively thin sheet of the order of 1/16 inch thickness along with the desired resilient characteristic. Plastics such as phenolics, polycarbonates or other thermoplastics having a high melt index are suitable for this purpose.

While the composite structure comprising the textile carpet sheet 41 and the thermoplastic layer 43 is capable of functioning as a vehicle floor mat and is an embodiment of this invention, it is preferred that this structure be combined with the second main body element 42. This second main body element 42 is formed from a rubber or plastic material that is relatively flexible in a thin-sheet form as described with respect to the FIG. 1 embodiment. It is also shown formed into a substantially same configured vehicle floor mat having longitudinal side edges 46, a rear end edge 47 and a front edge 48. Integrally formed with this main body element 42 is an upstanding rib 49 which extends around the major central area of mat which is substantially co-extensive with a predetermined floor-pan area of the vehicle floor. This rib 49 forms a closed loop that defines a generally rectangular interior space with the rib being relatively narrow and spaced a distance inwardly from the edges of the mat, thereby forming a peripheral marginal edge portion which will remain flexible. Inwardly of the rib 49, the main body element 42 is preferably relatively thinner and, in combination with the rib 49, forms a recessed area for receiving a cooperatively configured textile carpet main body element 41 and the associated rigidifying sheet-form element 43. A rectangularly shaped composite sheet, including the textile carpet element 41 and thermoplastic element 43 is disposed within this recessed area defined by an inner vertical wall 50 of the rib 49 and the upper surface 51 of the central area of the rubber sheet main body element 42. Securing of the main body element 42 and the textile carpet element 41 into an integral structure is effected by adhesive bonding with a layer of a suitable adhesive 52 interposed in bonding relationship between the juxtaposed surfaces of the thermoplastic rigidifying element 43 and the rubber sheet main body element surface 51. This resultant combined structure has a plurality of relatively thin, sheet-form elements that are flexible and a rigidifying sheet-form element that renders the coextensive areas substantially inflexible, or rigid within the context of this disclosure, thereby providing a vehicle floor mat that is very effectively capable of resisting transverse movement across a vehicle floor. For enhanced frictional engagement with an underlying carpeted floor, the main body element 42 may also be provided with a plurality of downwardly extending conical projections or nibs 53 on its bottom surface 54.

The embodiments hereinbefore described, except for the basic structure of the FIGS. 5 and 6 embodiment, were directed to a floor mat structure having a front end portion which was not rendered substantially inflexible. However, there are alternative floor mat structures for specific cars that may be otherwise configured and which may have areas other than a simple rectangular surface area rendered effectively inflexible. Although not illustrated, vehicle floor mats having a rigidifying sheetform element of other than rectangular configuration in plan view may be constructed and embody this invention. For example, the rigidifying element may be trapezoidal, circular, oval, triangular or of some other geometrical shape in plan view without departing from the scope of this invention and designed to meet the physical shape requirements of specific vehicles. However, it is generally prefered to design the rigidifying element with an area configuration that substantially conforms to the flat portion of the vehicle's floor. Also, while the rigidifying sheet-form element in the case of the FIG. 3 and FIG. 5 embodiments is shown disposed adjacent the bottom of the composite structures, the rigidifying element may be otherwise positioned. Placing the rigidifying element at the top surface of the FIG. 3 embodiment would result in a floor mat that functions in accordance with this invention so as to resist sliding movement. Such a mat construction would not have the relatively soft and pliable rubber or plastic composition at the top for cushioning contact with a person's foot.

Figure 7:
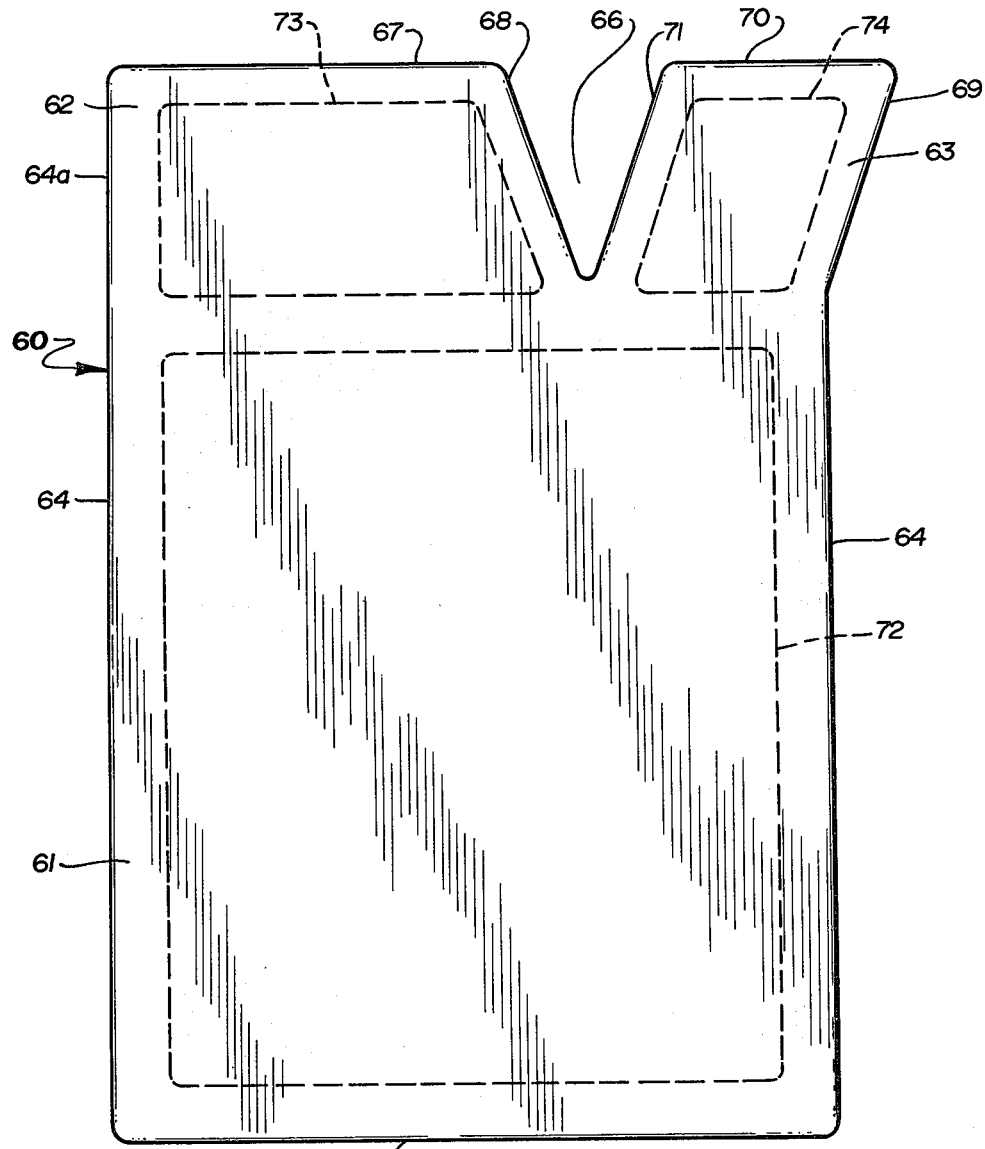
FIG. 7 is a top plan view of another modified floor mat having sheet-form rigidifying elements and embodying this invention.

Each of the three previously described embodiments comprised a structure wherein the rigidifying sheet-form element was coextensive substantially only with a horizontal portion of a vehicle's floor. This invention may also be embodied in a vehicle floor mat wherein portions of the mat that are designed to overlie non-horizontal vehicle floor surfaces may be rendered substantially inflexible by incorporation of a rigidifying sheet-form element in those auxiliary portions as well as in a primary section of the mat. A vehicle floor mat 60 illustrating this embodiment of the invention is shown in FIG. 7. This modified mat for purposes of illustration is described as incorporating the structural arrangement of the FIGS. 3 and 4 embodiment, but it will be understood that the rigidifying elements of the FIGS. 1 and 5 embodiments may also be utilized.

The floor mat 60 shown in FIG. 7 is designed to be used in front wheel drive type vehicles and is particularly useful with the smaller body style vehicles. Such vehicles generally incorporate a structural design that results in the front wheels being located closer to the interior compartment. As a consequence, at least a portion of the wheel wells intrudes into the interior compartment at the outer sides thereof and in the region of the vehicle driver's and passenger's feet. Accordingly, it is desirable that the floor mat embody a design configuration which will permit portions of the mat to overlie the upwardly extending portions of the wheel well in addition to an upwardly extending portion of the vehicle floor. The mat shown in plan view in FIG. 7 is designed for this purpose and while having an overall generally rectangular configuration includes a primary section 61 adapted to overlie the horizontal floor-pan area, a first auxiliary section 62 adapted to overlie an upwardly inclined forward portion of the front vehicle compartment floor, and a second auxiliary section 63 designed to overlie a portion of the wheel well. As shown, this mat has a generally rectangular configuration with the primary section 61 having opposite longitudinally extending side edges 64 and a rear end edge 65.

The two auxiliary sections 61 and 62 are formed at the front of the primary section and comprise integral continuations thereof with the auxiliary sections being substantially separated by a V-shaped notch 66. This results in the first auxiliary section having an outer peripheral edge including a continuation side edge 64a, a front end edge 67 and an interior angled side edge 68 that forms one side of the V-shaped notch 66. The second auxiliary section 63 has an outer peripheral edge including a longitudinal side edge 69 continuing from the side edge 64 of the primary section, a front end edge 70 and an interior angled side edge 71 that forms the opposite side of the V-shaped notch 66. It will be noted that the second section 63 is oriented in an outwardly angled relationship to the primary section 61 to align with the wheel well surface for a better fit. In accordance with this invention, the three mat sections 61, 62 and 63 include an integrally formed relatively thin, flexible sheet of rubber or plastic and each section is provided with its own respective rigidifying sheet-form element 72, 73 and 74. The structure and fabrication is essentially the same as that described with the FIGS. 3 and 4 embodiment and thus those details are not repeated. It will suffice to note that each of the rigidifying elements 72, 73 and 74 is of a configuration in top plan view that is similar to the respective section 61, 62 and 63, but relatively smaller, thereby leaving a peripheral marginal edge portion around each section that only comprises the thin flexible rubber or plastic sheet. Since the juncture between the primary section 61 and each of the two auxiliary sections 62 and 63 also comprises only the thin flexible sheet of rubber or plastic, those auxiliary sections may be readily flexed to conform to their respective supporting surface.

Figure 8:
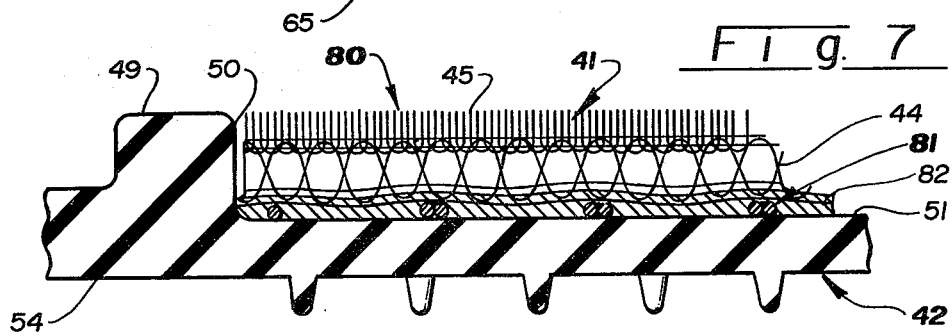
FIG. 8 is a fragmentary sectional view similar to FIG. 6, but showing a modification of the structure in that embodiment.

A modification of the mat structure shown in FIGS. 5 and 6 is illustrated in FIG. 8. This modification concerns the rigidifying sheet-form element and thus components and structural features that are the same are numbered as in FIGS. 5 and 6 and are not otherwise described. Accordingly, the mat 80 shown in FIG. 8 is seen to include a textile carpet main body element 41 and the thin sheet, rubber or plastic material main body element 42. Interposed between the juxtaposed bottom surface of the textile carpet and the upper surface 51 of the rubber bottom sheet 42 is a rigidifying sheet-form element 81 which comprises a structure substantially the same as that disclosed and described with reference to the FIG. 1 embodiment. A wire rod having the described structural rigidity and resilient characteristics is formed in a loop-form, open lattice-work configuration and is of a planar area size substantially equivalent to the recessed area. A layer of adhesive 82 interposed between the two surfaces serves to adhesively bond the several components into a unitary mat structure having the desired characteristics.

FIGS. 9 and 10 illustrate another modified floor mat 90 which also includes a main body 91 and a rigidifying sheet-form element 92. This embodiment incorporates a structure similar to those described with respect to FIGS. 5 and 8 in that it also includes a sheet 93 of textile carpet material. Similar to the FIGS. 5 and 8 embodiments, main body 91 which comprises a generally rectangularly shaped, relatively thin sheet of a rubber or plastic composition and is relatively flexible. The body is formed with a rectangularly shaped recess 94 for receiving therein the textile carpet sheet 93. Preferably, the main body 91 is also integrally formed with an upstanding rib 95 spaced a distance inwardly of the mat's peripheral edges and extending around the periphery of the recess 94 to provide a protective edging for the carpet as well as improve aesthetic appearance. Thus, the rib 95 has an inwardly facing vertical surface 96 extending a distance upwardly from the upper surface 97 of the main body's recess 94 so that the rib's top surface 98 will be substantially coextensive with the top surface of the carpet. The bottom surface 99 of the main body 91 may also be provided with a plurality of downwardly projecting, conically shaped nibs 100 to further enhance the mat's ability to remain in the desired position.

In this embodiment shown in FIGS. 9 and 10, the rigidifying element 92 is formed from a thin sheet of spring steel that may be of the order of 1/16 inch thick and having a rectangular shape similar in size to the recess 94. To reduce the amount of material required to form the rigidifying element, it is formed with large areas removed, thereby resulting in a rectangular border strip 101 having diagonally opposed corners interconnected by respective cross strips 102. As in the case of the rigidifying elements described with respect to the other illustrative embodiments, the materials and specific structural configuration of this rigidifying element 92 are selected and designed to have the requisite structural rigidity and resilient characteristics to function in accordance with the principle of this invention. Securing of the rigidifying element 92 with the main body in fixed relationship is effected by mechanical means in the form of securing tabs 103. A plurality of these tabs 103 are provided with three being integrally formed along the outer edge of the longitudinal portions of the border strip and two formed along the outer edge of the transverse portions. These tabs are initially formed as outwardly extending projections of the sheet-form rigidifying element, but during or as a part of the assembly of the element with the mat body, these tabs are bent downwardly into gripping engagement with the mat body. For this purpose, the main body 91 is formed with cooperatively located apertures 104 in the recess 94 adjacent the vertical surface 96 of the rib 95. In assembly, the tabs 103 are first bent to a 90 degree angle with respect to the plane of the rigidifying element and, when the element is positioned in the recess 94, these tabs will then project downwardly through respective apertures 104, substantially in the manner as shown in broken lines in FIG. 10. When thus positioned, the portion of each tab projecting beneath the bottom surface 99 of the mat's main body is then bent inwardly with respect to the rigidifying element into coplanar relationship to the mat's bottom surface. Thus, these tabs 103, which may be bent sufficiently to clamp a portion of the mat's main body 91 to the coextensive portion of the rigidifying element's border strip 101 are thereby effective to retain the rigidifying element 92 in securely fixed relationship with the main body.

Subsequent to assembly of the rigidifying element 92 with the main body 91, the textile carpet sheet 93 is then positioned in the recess 94. Securing of the carpet sheet is effected by a suitable adhesive spread in a layer 105 over the upper surface 97 of the recess and the rigidifying element 92 and flowing into a lower surface region of the carpet sheet to adhesively bond the components into a unitary mat structure.

The several examples of the rigidifying sheet-form elements and composite mat configurations that may be formed and utilized in fabrication of a mat embodying this invention are illustrated to provide suggestions as to further modifications that may be useful in adapting the mat to a particular vehicle configuration. The illustrated rigidifying element configurations and constructions illustrated in the accompanying drawing figures and specifically described herein are not deemed limitative or exhaustive of the structures and configurations that may be devised and which will also function in the desired manner to enable the mat to better resist lateral sliding forces and prevent displacement of the mat across a vehicle floor. Also, the specific materials described for forming of the illustrated rigidifying sheet-form elements are deemed exemplary and it is contemplated that other materials capable of exhibiting the desired structural rigidity and resilience characteristics may be selected or may be devised or developed.

Similarly, it will be understood that the several illustrative embodiments of the rigid rib structures as well as the main mat bodies are not limitative of the specific structures that may be devised. The relatively flexible sheet-form main bodies of the mat may be fabricated with a desired thickness appropriate for the selected materials and may be fabricated from various types of materials. Rubber and plastic compositions are commonly utilized in the fabrication of automotive vehicle floor mats and these materials may be utilized equally well in the fabrication of mats embodying this invention. Various types of carpet materials inclusive of sheets of woven textile carpeting may be utilized in the fabrication of mats embodying this invention and provided with rigidifying sheet-form element. Similarly, different types of materials may be utilized in the formation of the rigidifying elements with appropriate attention to selection of materials that are compatible so as to form a durable unitary structure. The physical criteria of the rigidifying elements for functioning in the floor mats of this invention is primarily a resilient rigidity that is capable of providing structural rigidity to the composite structure while permitting a certain degree of flexing to accommodate forces that may be applied as a consequence of persons placing their feet on the floor mat and exerting downward forces as well as laterally directed forces. As was explained in substantial detail, the rigidifying rib is not rigid in an exact sense, but is rigid as compared to the relatively flexible thin sheet forming the mat body. An objective of this particular arrangement of components is to enable the mat body to be formed from a relatively thin sheet thereby saving on materials and resulting in economy of manufacture. It will be apparent that the mat body may be fabricated with a substantially thicker cross-section than is illustrated and contemplated in this invention without departing from the spirit of the invention. It will also be noted that the thickness dimensions of some of the elements shown in the drawings may be exaggerated for clarity of illustration.

It will be readily apparent from the foregoing detailed description of the several illustrative embodiments of this invention that a particularly novel and advantageous automotive floor mat construction is disclosed. The construction of the floor mat, having a flexible sheet main body portion with a rigidifying sheet-form element incorporated therein, results in a structure that is uniquely capable of resisting lateral displacing forces, and thus, effectively maintain the mat in a desired position on the automotive vehicle floor.

Having thus described this invention, what is claimed is:

1. A floor mat for an automotive vehicle comprising
   a relatively thin, flexible sheet-form main body formed from a pliable material and of a predetermined surface area dimension to cover a specified portion of a vehicle floor, and
   a sheet-form rigidifying element secured in fixedly assembled association with said main body to effect structural rigidification thereof, said rigidifying element being formed of a material which is different from the material of said main body and disposed in substantially parallel relationship to said main body and coextensive with at least a selected area portion of said main body to impart structural rigidity thereto thereby effectively rendering at least that portion of said main body which is coextensive therewith substantially inflexible.

2. A floor mat according to claim 1 wherein said rigidifying element is an open mesh sheet.

3. A floor mat according to claim 1 wherein said main body is formed from a molded material and said rigidifying element is embedded in firmly fixed relationship in said main body.

4. A floor mat according to claim 1 wherein said main body is formed from a textile carpeting and said rigidifying element is a layer of thermoplastic material formed on a surface of the textile carpeting.

5. A floor mat according to claim 1 wherein said main body is formed from a textile carpeting and said rigidifying element is formed into an open mesh sheet.

6. A floor mat according to claim 1 wherein said sheet-from rigidifying element is mechanically secured to said main body.

7. A floor mat according to claim 1 wherein said sheet-form rigidifying element is secured to said main body by mechanical gripping means.

8. A floor mat according to claim 1 wherein said rigidifying element includes gripping means for mechanically engaging with said main body to secure said rigidifying element and main body in fixed association.

9. A floor mat according to claim 1 which includes a plurality of sheet-form rigidifying elements, each of said rigidifying elements being disposed in spaced relationship to each other rigidifying elements in substantially the same plane whereby the respective areas rigidified by said elements are capable of flexing relative to each other.

10. A floor mat for an automotive vehicle comprising
a relatively thin, flexible sheet-form main body formed from a pliable material and of a predetermined surface area dimension to cover a specified portion of a vehicle floor, and
a sheet-form rigidifying element secured in fixed association with said main body and effectively rendering that portion of said main body which is coextensive therewith substantially inflexible, said rigidifying element being formed from a rod-like bar into a plurality of closed loops disposed in a single plane in side-by-side relationship with each loop being secured to a next adjacent loop in rigidly interconnected relationship.

11. A floor mat for an automotive vehicle comprising
a relatively thin, flexible sheet-form main body formed from a molded, pliable material and of a predetermined surface area dimension to cover a specified portion of a vehicle floor, and
a sheet-form rigidifying element secured in integrally molded, fixed association with said main body, said rigidifying element formed from a similar material as said main body, but having a substantially greater durometer as to be relatively inflexible and effectively rendering that portion of said man body which is coextensive therewith substantially inflexible.

12. A floor mat according to claim 11 wherein said main body and said rigidifying element are disposed in superposed stacked relationship with said rigidifying element forming an exterior surface of the mat.

13. A floor mat according to claim 12 wherein said rigidifying element forms a bottom exterior surface of the mat.

14. A floor mat according to claim 11 wherein said rigidifying element is disposed within the interior of said main body.

15. A floor mat for an automotive vehicle comprising
first and second relatively thin, flexible sheet-form main bodies that are each formed from a pliable material disposed in substantially coplanar, coextensive relationship to each other and secured together to form a unitary mat structure with one of said main bodies being formed from a textile carpeting, and
a sheet-form rigidifying element secured in fixed association with the one main body formed from a textile carpeting, said rigidifying element formed from a thermoplastic material as a layer on a surface of the one said main body and effectively rendering those portions of the main bodies that are coextensive therewith substantially inflexible.

16. A floor mat according to claim 15 wherein said one main body formed from a textile carpeting having the layer of thermoplastic material formed thereon is secured by an adhesive to the other main body.

17. A floor mat for an automotive vehicle comprising
first and second relatively thin, flexible sheet-form main bodies that are each formed from a pliable material disposed in substantially coplanar, coextensive relationship to each other and secured together to form a unitary mat structure with one of said main bodies being formed from a textile carpeting, and
a sheet-form rigidifying element secured in fixed association with at least one of said main bodies, said rigidifying element being formed into an openmesh sheet and effectively rendering those portions of the main bodies that are coextensive therewith substantially inflexible.

18. A floor mat according to claim 15 or 17 wherein the other of said main bodies is formed from a molded material.

19. A floor mat for an automotive vehicle comprising
a relatively thin, flexible sheet-form main body formed from a pliable material and of a predetermined surface area dimension to cover a specified portion of a vehicle floor, and
a sheet-form rigidifying element secured in fixed association with said main body, said rigidifying element effectively rendering that portion of said main body which is coextensive therewith substantially inflexible and including gripping means for mechanically engaging with said main body to secure said rigidifying element and main body in fixed association, said gripping means comprising a plurality of tabs carried by said rigidifying element in spaced relationship to each other and said main body being formed with a plurality of apertures through which respective ones of said tabs project to grip a portion of the main body between each of said tabs and a coextensive portion of said rigidifying element.

20. A floor mat for an automotive vehicle comprising
a relatively thin, flexible sheet-form main body formed from a pliable material and of a predetermined surface area dimension to cover a specified portion of a vehicle floor,
a sheet-form rigidifying element disposed in superposed, overlying relationship to and secured in fixed association with said main body, said rigidifying element effectively rendering that portion of said main body which is coextensive therewith substantially inflexible and including gripping means for mechanically engaging with said main body to secure said rigidifying element and main body in fixed association, and a covering sheet disposed in superposed, overlying relationship to said rigidifying element, said covering sheet being substantially coextensive in surface area with said rigidifying element.

21. A floor mat according to claim 20 wherein said covering sheet is a sheet of carpeting.

* * * * *